J. G. WALTERS.
ANTISKID DEVICE FOR VEHICLE WHEELS.
APPLICATION FILED DEC. 15, 1921.
1,431,856. Patented Oct. 10, 1922.
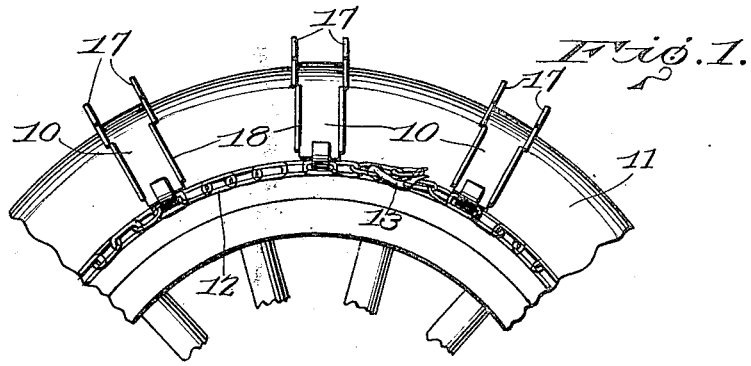
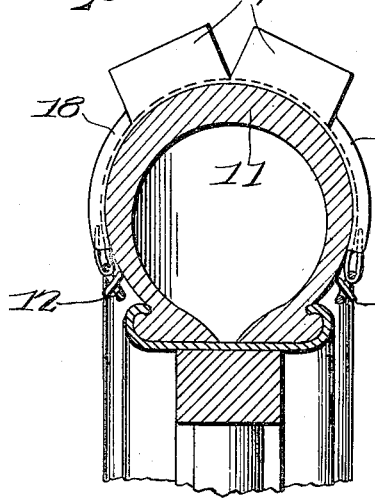
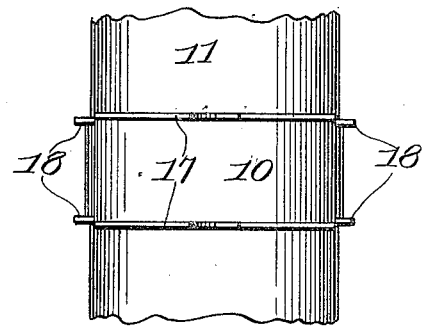
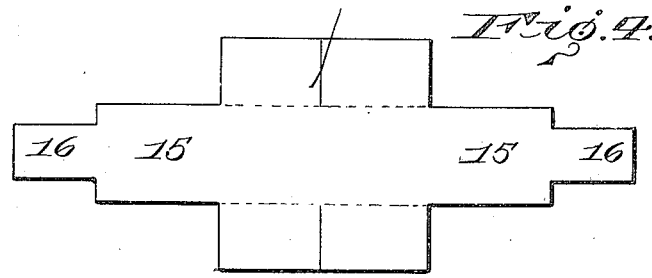
Inventor
Jacob G. Walters
By
Attorney Patented Oct. 10, 1922.

1,431,856

UNITED STATES PATENT OFFICE.

JACOB G. WALTERS, OF ARMSTRONGS MILLS, OHIO.

ANTISKID DEVICE FOR VEHICLE WHEELS.

Application filed December 15, 1921. Serial No. 522,581.

*To all whom it may concern:*

Be it known that I, JACOB G. WALTERS, a citizen of the United States, residing at Armstrongs Mills, in the county of Belmont, State of Ohio, have invented certain new and useful Improvements in Antiskid Devices for Vehicle Wheels; and I do hereby declare the following to be a full, clear, and exact description of the invention, such as will enable others skilled in the art to which it appertains to make and use the same.

The object of the invention is to provide an anti-skid traction device for vehicle wheel treads, and particularly for those wheels having pneumatic and cushion tires and adapted not only to increase the tractive effect and prevent skidding of the wheels, but to serve as a protection for the wheel treads while providing for the self-cleaning thereof to prevent the obstructive accumulation of mud thereby; and with this object in view, the invention consists in a construction and arrangement of parts of which a preferred embodiment is illustrated in the accompanying drawing, wherein:

Figure 1 is a side view of an anti-skid device, embodying the invention, applied in the operative position to a wheel, Figure 2 is a cross-sectional view of the same showing a shoe in elevation, Figure 3 is a plan view thereof, and Figure 4 is a plan view of the blank from which the shoe is constructed.

The device consists of a plurality of shoes 10 of arched form, disposed in transverse spanning relation with the tread of a wheel tire indicated at 11, with the extremities of the shoes connected at opposite sides of the wheel tire by retaining chains 12, of which the extremities may be secured together by any suitable or preferred fastening means, indicated at 13.

Any desired number of shoes may be employed in connection with each wheel to be protected, and may be spaced at any desired intervals to suit the service for which the device is intended, as for example, the characteristics of the road surface to be traversed. Each shoe, however, (all of which correspond in construction) consists of a blank indicated prior to the shaping thereof in Figure 4, having a body portion 14 of substantially rectangular form from which project the oppositely directed arms 15 of reduced width which terminate in still further reduced tongues 16 which are adapted to be folded or doubled upon themselves to provide loops for engagement with the links of the retaining chains, said links preferably being of rectangular or square form, as illustrated. At least the chains should have rectangular links or links having straight sides for engagement by the terminal loops of the shoes, to provide for holding the shoes firmly against displacement with relation to the wheel tread.

The projecting side edges of the body portion of the blank are split on lines perpendicular to the side edges of the arms and are upturned or outwardly directed to form ears 17 of greater or less projection according to the specific purpose for which the device is designed and arranged in a slightly divergent relation with each other transversely of the shoe to permit of ready casting or discharging any mud which may be forced thereinto in the travel of the wheel to which the device is attached. The splitting of the edge portions of the blank permits the angular spreading of the ears to conform to the arched or curved arrangement of the body portion of the shoe and consequently to increase the affixed width of the road engaging elements of the shoe.

As a further means of reenforcement, the side edges of the reduced arms or extensions of the body portion of the shoe are upwardly or outwardly turned or deflected to form ribs or flanges 18 which stiffen the arms and, at the same time, afford additional means for engaging the surface traversed when the ears are embedded in a relatively soft substance, such as a muddy stretch of the roadway.

It will be obvious that the simplicity of the construction, aside from the shoes, consists merely of the side retaining chains and wherein the shoes are formed from blanks of sheet or plate material, provides for a construction of the device at a relatively small cost and for the replacement of a worn or damaged shoe without affecting the other elements of the structure, to the end that a comparatively extended period of usefulness of the device is afforded.

It will be noted that by reason of the divergent relation of the ears at each side of the body, the outer edge faces of the ears form angles with the inner radial edge faces, to produce points which will readily penetrate into mud, sand, and the like.

What is claimed is:

An anti-skid device for a wheel comprising a body disposed transversely of the tread of a tire and having arms disposed in embracing relation to the sides thereof, the said arms having angularly extending longitudinal marginal flanges and being of lesser width than the body, the body having a plurality of ears extending at right angles therefrom and at the opposite sides thereof, the outer road engaging edge faces of the ears of each side of the body being in outwardly directed intersecting planes whereby to form road surface penetrating points, said ears being spaced apart to provide spaces through which mud is adapted to be directed from the ears while the wheel rotates.

In testimony whereof, I affix my signature, in the presence of two witnesses.

JACOB G. WALTERS.

Witnesses:
 PEARL WILKINSON,
 EDNA WILKINSON.